US012499418B2

(12) United States Patent
Shao et al.

(10) Patent No.: US 12,499,418 B2
(45) Date of Patent: Dec. 16, 2025

(54) METHODS, INTERNET OF THINGS (IOT) SYSTEMS, AND MEDIUMS FOR PIPELINE REPAIR BASED ON SMART GAS

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Xiaojun Wei, Chengdu (CN); Feng Wang, Chengdu (CN); Junyan Zhou, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 19/008,585

(22) Filed: Jan. 2, 2025

(65) Prior Publication Data

US 2025/0148430 A1 May 8, 2025

(30) Foreign Application Priority Data

Oct. 28, 2024 (CN) .......................... 202411507310.2

(51) Int. Cl.
*G06Q 10/20* (2023.01)
*G06Q 50/06* (2024.01)
*G06Q 50/26* (2024.01)

(52) U.S. Cl.
CPC ............. *G06Q 10/20* (2013.01); *G06Q 50/06* (2013.01); *G06Q 50/26* (2013.01)

(58) Field of Classification Search
CPC ......... G06Q 10/20; G06Q 50/06; G06Q 50/26
See application file for complete search history.

(56) References Cited

U.S. PATENT DOCUMENTS 11,270,385 B1 * 3/2022 Bryant ................... G06Q 10/10
12,276,381 B2 * 4/2025 Shao ......................... F17D 5/06
(Continued)

FOREIGN PATENT DOCUMENTS

CA 3054521 C * 2/2023 ......... G02B 27/0093
CN 117010663 A 11/2023
(Continued)

OTHER PUBLICATIONS

ClearWater Plumbers "Gas Line Pressure Testing in Fort Worth" Apr. 7, 2017, https://web.archive.org/web/20170407235102/https://www.clearwaterplumber.com/plumbing-services/gas-line-pressure-testing/ (Year: 2017).*

IT Convergence "IoT Based Remote Pipeline Monitoring Systems", Jan. 30, 2020, https://www.itconvergence.com/blog/remote-monitoring-detect-pipeline-leaks/ (Year: 2020).*

(Continued)

*Primary Examiner* — Gerardo Araque, Jr.
(74) *Attorney, Agent, or Firm* — METIS IP LLC (57) ABSTRACT

Embodiments of the present disclosure provide a method, an Internet of Things (IoT) system, and a medium for pipeline repair based on smart gas. The method is executed based on a government supervision and management platform of the IoT system for pipeline repair based on smart gas. The method includes: obtaining pipeline repair equipment information and pipeline data to be repaired; determining a pipeline repair sequence based on the pipeline repair equipment information and the pipeline data to be repaired; based on the repair commands, performing at least one of the following operations: receiving feedback information; determining an updated collection frequency for a pressure regulating equipment and a gas metering device deployed on a target gas pipeline based on the feedback information; and generating a repair update command based on the pipeline data to be repaired, a pressure regulating parameter, a gas supply parameter, and a monitoring data.

9 Claims, 4 Drawing Sheets

(56) References Cited

U.S. PATENT DOCUMENTS

| | | | | |
|---|---|---|---|---|
| 2013/0293389 | A1* | 11/2013 | Sinsuan | H04L 1/0038 340/870.02 |
| 2016/0370798 | A1* | 12/2016 | Georgeson | G05B 23/00 |
| 2020/0019893 | A1* | 1/2020 | Lu | G06N 5/025 |
| 2020/0075027 | A1* | 3/2020 | Arantes | G06Q 50/40 |
| 2023/0125033 | A1* | 4/2023 | Shao | G06Q 10/06312 705/7.22 |
| 2023/0141593 | A1* | 5/2023 | Ramer | G06Q 10/063112 705/7.42 |
| 2023/0259843 | A1* | 8/2023 | Shao | G06Q 50/06 705/7.23 |
| 2024/0054367 | A1 | 2/2024 | Shao et al. | |
| 2024/0151368 | A1 | 5/2024 | Shao et al. | |
| 2024/0202672 | A1 | 6/2024 | Shao et al. | |
| 2024/0265483 | A1 | 8/2024 | Shao et al. | |
| 2025/0060341 | A1* | 2/2025 | Shinholt | G01N 30/30 |

FOREIGN PATENT DOCUMENTS

| | | | | |
|---|---|---|---|---|
| CN | 117436847 | A | | 1/2024 |
| CN | 117495356 | A | | 2/2024 |
| CN | 118012848 | A | | 5/2024 |
| CN | 118035340 | A * | 5/2024 | G06Q 10/20 |
| EP | 4509830 | A1 * | 2/2025 | G01N 30/8696 |
| WO | WO-2021071796 | A1 * | 4/2021 | B64F 5/40 |
| WO | WO-2023081481 | A1 * | 5/2023 | G06Q 10/0631 |

OTHER PUBLICATIONS

Digi International "IoT in Oil and Gas_ 4 Use Cases and Advantages", Oct. 17, 2024, https://www.digi.com/blog/post/iot-in-oil-and-gas#:~:text=Asset%20monitoring%20IoT%20oil%20and,issues%20before%20they%20affect%20operations. (Year: 2024).*

Pawaskar, "Smart Piped Natural Gas (PNG) Meter with IoT Technology," 2024 4th International Conference on Soft Computing for Security Applications (ICSCSA), Salem, India, 2024, pp. 647-650, doi: 10.1109/ICSCSA64454.2024.00111 (Year: 2024).*

Wanasinghe "The Internet of Things in the Oil and Gas Industry: A Systematic Review," in IEEE Internet of Things Journal, vol. 7, No. 9, pp. 8654-8673, Sep. 2020, doi: 10.1109/JIOT.2020.2995617 (Year: 2020).*

Ekka et al, "An Effective Early Detection and Prediction System for Gas Leakage in Smart Environments," 2023 14th International Conference on Computing Communication and Networking Technologies (ICCCNT), Delhi, India, 2023, pp. 1-7, doi: 10.1109/ICCCNT56998.2023.10307696 (Year: 2023).*

Saboo, S. "Optimizing Gas Pipeline Operations with Machine Learning: A Case Study of A North American Energy Company." Paper presented at the SPE Conference at Oman Petroleum & Energy Show, Muscat, Oman, Apr. 2024. doi: https://doi.org/10.2118/218564-MS (Year: 2024).*

Temer et al., "Moving Toward Smart Monitoring and Predictive Maintenance of Downhole Tools Using the Industrial Internet of Things IIoT." Paper presented at the Abu Dhabi International Petroleum Exhibition & Conference, Abu Dhabi, UAE, Nov. 2017. doi: https://doi.org/10.2118/188382-MS (Year: 2017).*

Notification to Grant Patent Right for Invention in Chinese Application No. 202411507310.2 mailed on Jan. 6, 2025, 5 pages.

* cited by examiner

```
┌─────────────────────────────────────────────┐
│ Obtaining pipeline repair equipment          │ ⟿ 210
│ information and pipeline data to be repaired │
│ through the gas company management platform  │
└─────────────────────────────────────────────┘
                      ↓
┌─────────────────────────────────────────────┐
│ Determining a pipeline repair sequence based │ ⟿ 220
│ on the pipeline repair equipment             │
│ information and the pipeline data to be repaired │
└─────────────────────────────────────────────┘
                      ↓
```

Based on the repair commands, performing at least one of the following operations

- 231: Receiving feedback information captured by the citizen user platform through the government supervision service platform

- 232: Determining an updated collection frequency for a pressure regulating equipment and a gas metering device deployed on a target gas pipeline based on the feedback information, and sending the updated collection frequency to the pressure regulating equipment and the gas metering device

- 233: Obtaining a pressure regulating parameter during a repair process captured by the pressure regulating equipment and a gas supply parameter during the repair process captured by the gas metering device

- 234: Obtaining monitoring data captured by monitoring components deployed on remaining target repair pipelines through the gas company management platform

- 235: Generating a repair update command based on the pipeline data to be repaired, the pressure regulating parameter, the gas supply parameter, and the monitoring data (Group 230)

- 240: For the repair command in progress, in response to the presence of a pipeline repair equipment that satisfies a predetermined condition, estimating a total repair time of each of the repair commands in progress

- 250: Determining at least one of the target repair commands based on the total repair time

- 260: Updating the repair parameters of the target repair commands

METHODS, INTERNET OF THINGS (IOT) SYSTEMS, AND MEDIUMS FOR PIPELINE REPAIR BASED ON SMART GAS

CROSS-REFERENCE TO RELATED APPLICATIONS

This application claims priority to Chinese application No. 202411507310.2, filed Oct. 28, 2024, the entire contents of which are incorporated herein by reference.

TECHNICAL FIELD

The present disclosure relates to the field of gas line repair, and in particular, to a method, an Internet of Things (IoT) system, and a medium for pipeline repair based on smart gas.

BACKGROUND

Gas pipelines are subject to external factors (e.g., corrosion, vibration, accidental contact, etc.) that can cause failure or accidents. When a gas pipeline failure or accident is monitored, it is necessary for the gas company to send a professional technician to inspect and repair the gas pipeline using specialized repair equipment. Because of different points in time, the gas supply tension of the gas pipeline varies, and the professional repair equipment is limited. How to satisfy the gas users' gas supply demand while reasonably scheduling the professional repair equipment and arranging the gas pipeline repair time is a problem that needs to be considered. At present, the gas company mainly dispatches professional repair equipment and arranges the repair time of the gas pipeline based on management experience. However, there may be cases where manual processing is not timely, inefficient, or unreasonable, which can cause problems for a government supervision and management platform for the global operation and management of gas lines.

Therefore, it is desired to provide a method, an Internet of Things (IoT) system, and a medium for pipeline repair based on smart gas as a means for repairing gas pipelines, which can determine a reasonable pipeline repair sequence for malfunctioning gas pipelines and ensure that gas supply demand of citizen users is met.

SUMMARY

One or more embodiments of the present disclosure provide a method for pipeline repair based on smart gas. The method is executed by a government supervision and management platform based on an IoT system for pipeline repair based on smart gas. The IoT system includes a citizen user platform, a government supervision service platform, the government supervision and management platform, a gas company management platform and a gas equipment object platform, and the method comprising: obtaining pipeline repair equipment information and pipeline data to be repaired through the gas company management platform; determining a pipeline repair sequence based on the pipeline repair equipment information and the pipeline data to be repaired; the pipeline repair sequence including a plurality of repair commands, each of the plurality of repair commands being performed by at least one target pipeline repair equipment, and each of the plurality of repair commands include a target repair pipeline and repair parameters corresponding to the target repair pipeline; based on the repair commands, performing at least one of the following operations: receiving feedback information captured by the citizen user platform through the government supervision service platform; determining an updated collection frequency for a pressure regulating equipment and a gas metering device deployed on a target gas pipeline based on the feedback information, and sending to the pressure regulating equipment and the gas metering device for performed; obtaining a pressure regulating parameter during a restoration process captured by the pressure regulating equipment and a gas supply parameter during the restoration process captured by the gas metering device; obtaining monitoring data captured by monitoring components deployed on remaining target repair pipelines through the gas company management platform; and generating a repair update command based on the pipeline data to be repaired, the pressure regulating parameter, the gas supply parameter, and the monitoring data, the repair update command being used to control the updating of the pipeline repair sequence.

One or more the embodiments of this disclosure provide an Internet of Things (IoT) system for pipeline repair based on smart gas, comprising a citizen user platform, a government supervision service platform, a government supervision and management platform, a government supervision sensor network platform, a government supervision object platform, a gas company sensor network platform and a gas equipment object platform; wherein the government supervision service platform includes a citizen cloud service sub-platform and a government safety supervision service sub-platform, the government supervision and management platform includes a government gas management sub-platform and a government safety management sub-platform, and the government supervision sensor network platform includes a government gas management sensor network sub-platform and a government safety management sensor network sub-platform, the government supervision object platform including a gas company management platform; the citizen user platform is configured to interact with data from the citizen cloud service sub-platform and the government safety supervision service sub-platform for data; the government gas management sub-platform is configured to interact with data between the citizen cloud service sub-platform and the government gas management sensor network sub-platform; the government safety management sub-platform is configured to interact with data between the government supervision service platform and the government safety management sensor network sub-platform; the gas company management platform is configured to interact with data between the government gas management sensor network sub-platform and the government safety management sensor network sub-platform; the gas company sensor network platform is configured to interact with date between the gas equipment object platform and the gas company management platform; The government supervision and management platform is configured to perform the method for pipeline repair based on smart gas.

One or more embodiments of the present disclosure provide a computer-readable storage medium, the storage medium storing computer instructions, and the computer executing the method for pipeline repair based on smart gas when the computer reads the computer instructions in the storage medium.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 2 is an exemplary flowchart of a method for pipeline repair based on smart gas according to some embodiments of the present disclosure;

DETAILED DESCRIPTION

Figure 1:
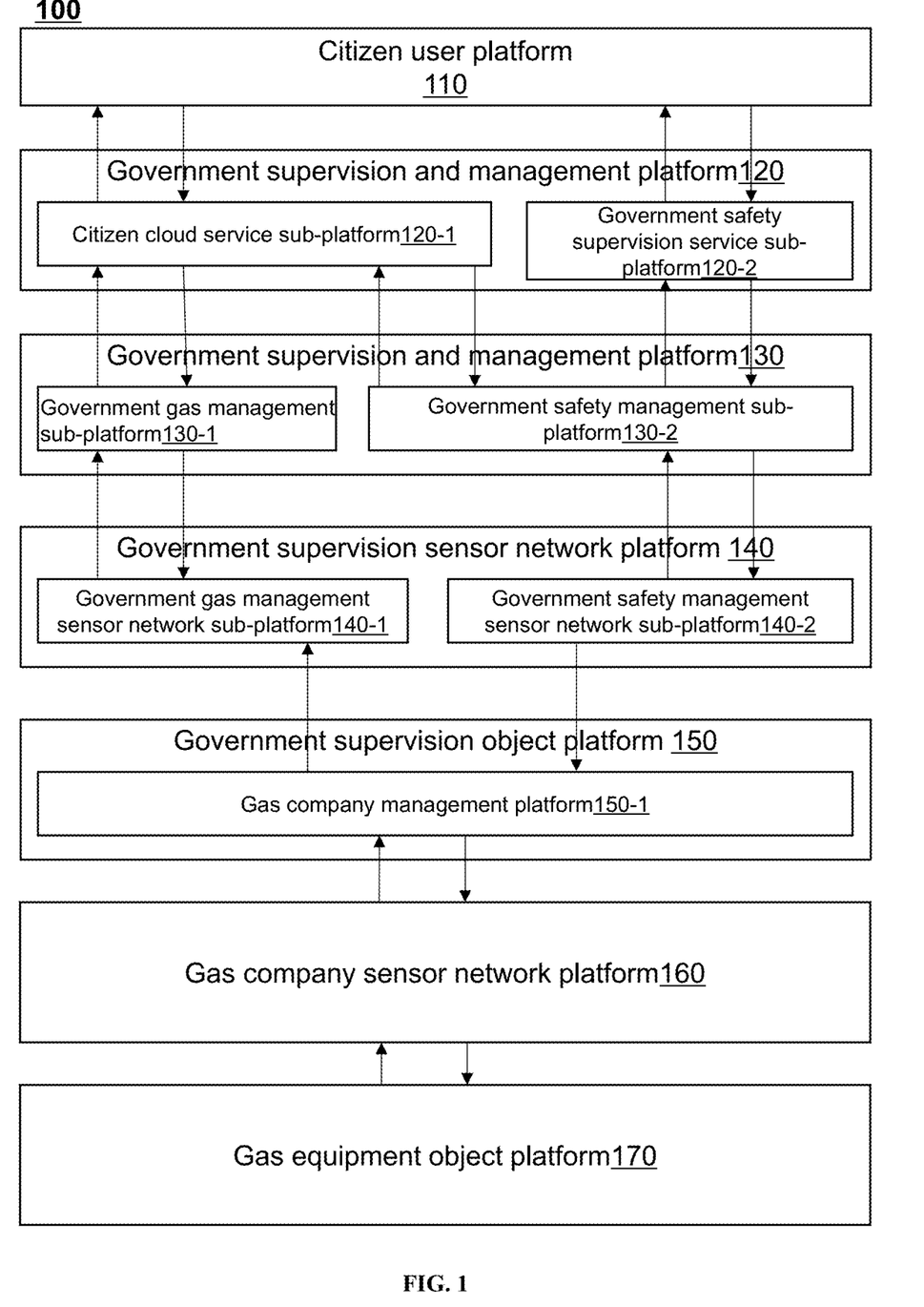
FIG. 1 is an exemplary platform structure diagram of an Internet of Things (IoT) system for pipeline repair based on smart gas according to some embodiments of the present disclosure.

FIG. 1 is an exemplary platform structure diagram of an Internet of Things (IoT) system for pipeline repair based on smart gas according to some embodiments of the present disclosure.

As shown in FIG. 1, the IoT system 100 for pipeline repair based on smart gas may include a citizen user platform 110, a government supervision service platform 120, a government supervision and management platform 130, a government supervision sensor network platform 140, a government supervision object platform 150, a gas company sensor network platform 160, and a gas equipment object platform 170.

The citizen user platform 110 refers to a platform for interaction with citizen users.

In some embodiments, the citizen user platform 110 is configured to interact with the citizen cloud service sub-platform 120-1 and the government safety supervision service sub-platform 120-2 for data transmission. For example, the citizen user platform 110 may be configured to obtain feedback information of the citizen user and send it to the citizen cloud service sub-platform 120-1 of the government supervision service platform 120.

The government supervision service platform 120 is a platform that provides regulatory services to a government.

In some embodiments, the government supervision service platform 120 may include a citizen cloud service sub-platform 120-1 and a government safety supervision service sub-platform 120-2.

The citizen cloud service sub-platform 120-1 is a sub-platform that may provide gas business services to the citizen users.

The government safety supervision service sub-platform 120-2 is a sub-platform that may provide safety supervision services to the citizen users.

The government supervision and management platform 130 refers to a platform for the government to perform regulatory management. For example, the government supervision and management platform 130 may be configured to perform the method for pipeline repair based on smart gas in FIG. 2.

In some embodiments, the government supervision and management platform 130 may include a government gas management sub-platform 130-1 and a government safety management sub-platform 130-2.

The government gas management sub-platform 130-1 may be a sub-platform for the government to carry out regulatory management of gas business. In some embodiments, the government gas management sub-platform 130-1 is configured to interact with the citizen cloud service sub-platform 120-1 and the government gas management sensor network sub-platform 140-1 for data interaction.

The government safety management sub-platform 130-2 may be a sub-platform for the government to perform security regulatory management. In some embodiments, the government safety management sub-platform 130-2 is configured to interact with the government supervision service platform 120 and the government safety management sensor network sub-platform 140-2 for data interaction.

The government supervision sensor network platform 140 is an interface platform for realizing interactions between the government supervision and management platform 130 and the government supervision object platform 150, and is configured as a communication network and gateway.

In some embodiments, the government supervision sensor network platform 140 may include a government gas management sensor network sub-platform 140-1 and a government safety management sensor network sub-platform 140-2.

The government gas management sensor network sub-platform 140-1 may be an interface platform for realizing interactions between the government gas management sub-platform 130-1 and the gas company management platform 150-1.

The government safety management sensor network sub-platform 140-2 may be an interface platform for realizing interactions between the government safety management sub-platform 130-2 and the gas company management platform 150-1.

The government supervision object platform 150 may be a functional platform used by the government to sense a generation of information and control an execution of information.

In some embodiments, the government supervision object platform 150 may include a gas company management platform 150-1.

The gas company management platform 150-1 may be a platform used by a gas company for sensing information generation and controlling information execution.

In some embodiments, the gas company management platform 150-1 may be configured to interact with data with the government gas management sensor network sub-platform 140-1 and the government safety management sensor network sub-platform 140-2.

The gas company sensor network platform 160 may be an interface platform that enables interaction between the gas company management platform 150-1 and the gas equipment object platform 170, configured as a communication network and a gateway.

In some embodiments, the gas company sensor network platform 160 may be configured to interact with data with the gas equipment object platform 170 and the gas company management platform 150-1. For example, the gas company sensor network platform 160 may obtain the pipeline repair equipment information through the gas equipment object platform 170 and send it to the gas company management platform 150-1.

The gas equipment object platform 170 is a functional platform that can sense information related to gas equipment and perform control information.

In some embodiments, the gas equipment object platform 170 may include a pipeline repair equipment or the like.

Figure 3:
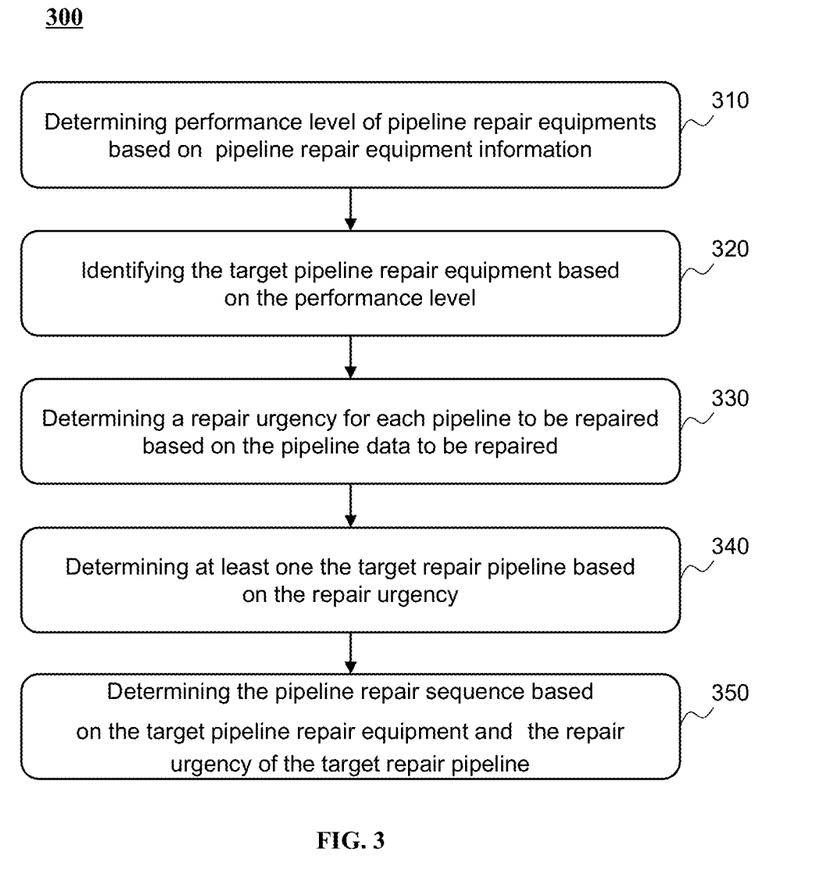
FIG. 3 is an exemplary flowchart of determining a pipeline repair sequence according to some embodiments of the present disclosure.
Figure 4:
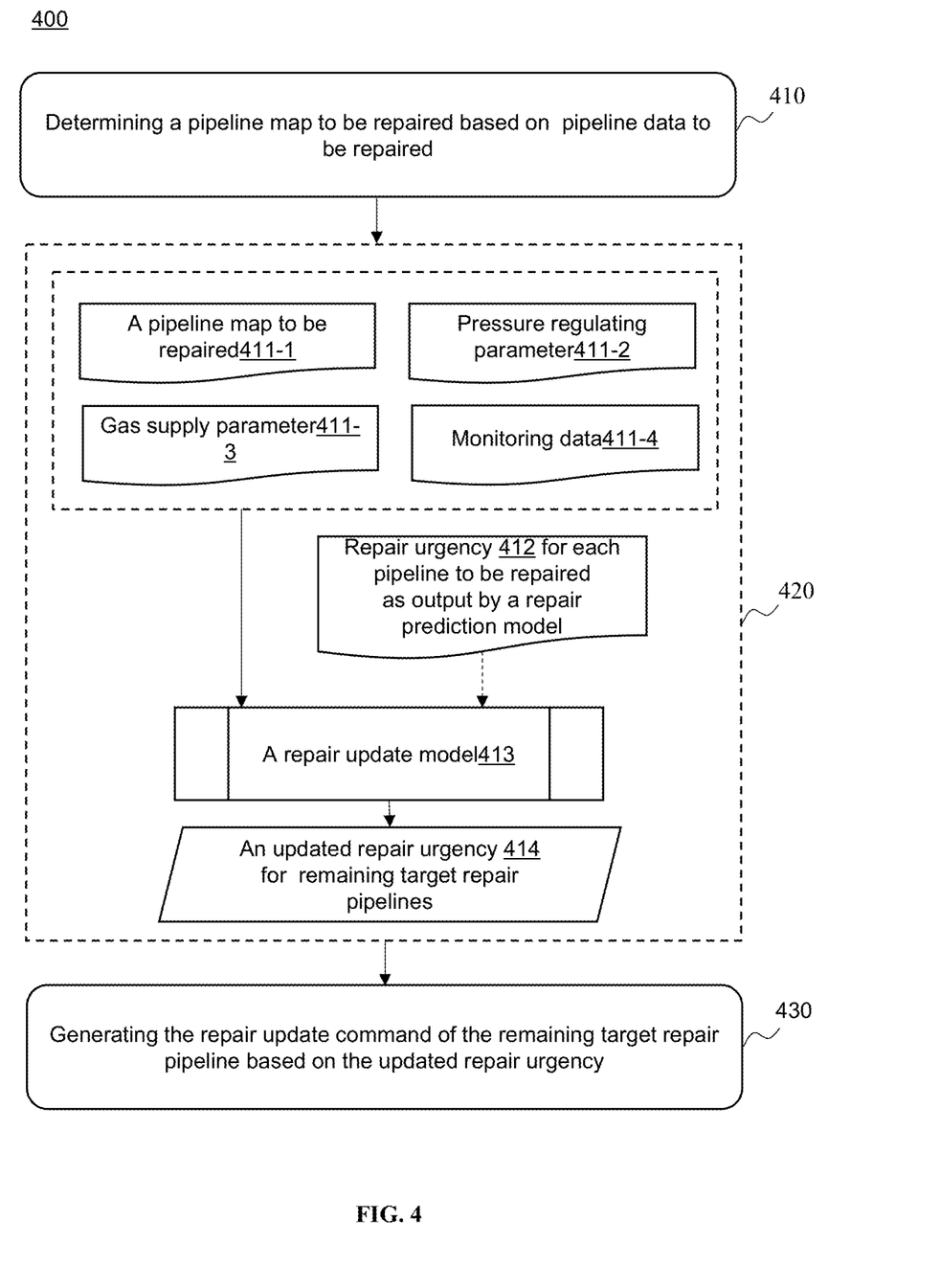
FIG. 4 is an exemplary flowchart of generating a repair update command according to some embodiments of the present disclosure.

For more information about the citizen user platform 110, the government supervision service platform 120, the government supervision and management platform 130, the government supervision sensor network platform 140, the government supervision object platform 150, the gas company sensor network platform 160, and the gas equipment object platform 170, please refer to the descriptions in FIG. 2-FIG. 4.

FIG. 2 is an exemplary flowchart of a method for pipeline repair based on smart gas according to some embodiments of the present disclosure. In some embodiments, the process 200 may be performed by the government supervision and management platform of the IoT system 100 for pipeline repair based on smart gas. As shown in FIG. 2, process 200 includes step 210-step 260 described below.

Step 210, obtaining pipeline repair equipment information and pipeline data to be repaired through the gas company management platform.

For a description of the gas company management platform, see the related description in FIG. 1.

The pipeline repair equipment information is information related to pipeline repair equipments.

The pipeline repair equipment refers to an equipment used to repair holes, cracks, blockages, and other problems in gas pipelines or gas lines. For example, the pipeline repair equipment may include a pipeline filling machine, a pipeline internal coating equipment, a trenchless pipeline repair equipment, a pipeline rapid repair kit, an endoscopic inspection equipment, etc.

The pipeline repair equipment can be used to repair the gas pipelines or the gas lines to keep the gas pipelines or the gas lines running normally and prolong a service life. The gas pipelines can be matched with one or more types of the pipeline repair equipment according to fault types of the gas pipelines during an actual repair process.

In some embodiments, the pipeline repair equipment information may include equipment usage data and/or equipment monitoring data.

The equipment usage data refers to data whether or not each of a plurality of pipeline repair equipments is in use.

The equipment monitoring data is the most recent monitoring data for the pipeline repair equipment from the current moment.

In some embodiments, the equipment monitoring data may include a plurality of indicator data, the plurality of indicator data being related to performance of various types of the pipeline repair equipment, such as, for example, a temperature, a vibration amplitude, and a current level of the various types of the pipeline repair equipment. The types of the plurality of indicator data may be different for the various types of the pipeline repair equipment.

In some embodiments, the gas company management platform may obtain the pipeline repair equipment information from the gas equipment object platform through the gas company sensor network platform, and the government supervision and management platform may obtain the pipeline repair equipment information from the gas company management platform through the government supervision sensor network platform.

The pipeline data to be repaired is data related to a pipeline to be repaired. The pipeline to be repaired is a gas pipeline where a gas failure occurred.

In some embodiments, a repair urgency can be different due to the different fault types of the pipeline to be repaired.

The repair urgency refers to a degree to which the pipeline to be repaired affects a safety of the citizen user. For example, certain fault types of pipelines to be repaired need to be repaired urgently, and certain fault types of pipelines to be repaired can be put back a little to be repaired.

In some embodiments, the pipeline data to be repaired includes at least one of a fault type, a location, a length, and pipeline operation parameters of at least one of pipelines to be repaired collected in a preset time period.

The fault type is a type to which the gas pipeline fault belongs. For example, the fault type may include at least one of a leak fault, a crack fault, a blockage fault, or the like.

The preset time period may be a time period between a current moment and a certain preset historical moment. The preset historical moment may be predetermined empirically for those skilled in the art.

The pipeline operation parameters may include at least one of a pressure, a flow rate, a temperature, etc. of the pipelines to be repaired.

In some embodiments, the gas company management platform may obtain the pipeline data to be repaired from a call center or other department, and the government supervision and management platform may obtain the pipeline data to be repaired from the gas company management platform through the government supervision sensor network platform.

Step 220, determining a pipeline repair sequence based on the pipeline repair equipment information and the pipeline data to be repaired.

In some embodiments, the pipeline repair sequence (or pipeline repair order or repair order) may include a plurality of repair commands, each of the plurality of repair commands is executed by at least one of the target pipeline repair equipments, and each of the plurality of repair commands includes a target repair pipeline and repair parameter corresponding to the target repair pipeline.

The target repair pipeline is a pipeline to be repaired that requires urgent rehabilitation.

The target pipeline repair equipment means a pipeline repair equipment that performs repair for the target repair pipeline.

The repair parameters are parameters related to the target repair pipeline.

In some embodiments, the repair parameters may include a repair order of the target repair pipeline and/or a type of the target pipeline repair equipment used to repair the target repair pipeline.

In some embodiments, the government supervision and management platform may utilize all of the pipelines to be repaired involved in the pipeline data to be repaired as the target repair pipelines in the plurality of repair commands.

In some embodiments, the government supervision and management platform may determine the repair order for the target repair pipelines in the repair parameters based on the fault type of the pipeline data to be repaired, through a first preset comparison table.

The first preset comparison table includes a correspondence between a reference fault type and a reference repair order for the target repair pipeline. The first preset comparison table may be constructed based on a priori knowledge or historical data.

In some embodiments, in response to existence of the plurality of target repair pipelines for a same fault type, the government supervision and management platform may randomize the repair order of the target repair pipelines.

In some embodiments, the government supervision and management platform may determine, based on the fault type of the target repair pipeline in the pipeline data to be repaired, a type of the target pipeline repair equipment to be used of the target repair pipeline in the repair parameters, through a second preset comparison table.

The second preset comparison table includes a correspondence between a reference fault type and a type of the target pipeline repair equipment used to treat the reference target repair pipeline. The second preset comparison table may be constructed based on a priori knowledge or the historical data.

In some embodiments, the government supervision and management platform may sequentially assign a target pipeline repair equipment that matches a fault type of the target repair pipeline based on the repair order of the target repair pipeline and the pipeline repair equipment information, in order of the repair order.

In some embodiments, the government supervision and management platform may also determine a pipeline repair sequence using a method shown in FIG. 3, as described in FIG. 3.

Step 230, based on the repair commands, performing at least one of the following operations.

In some embodiments, the government supervision and management platform may perform at least one of the following operations based on the repair commands, and each of the following operations may include a following step 231-step 235.

Step 231, receiving feedback information captured by the citizen user platform through the government supervision service platform.

For the description of the government supervision service platform and the citizen user platform, please refer to the related description in FIG. 1.

The feedback information is information given back by the citizen users during a repair of the target repair pipeline.

In some embodiments, the feedback information may include failure feedback information, repair feedback information, gas usage feedback information, or the like, received from the citizen users during the repair of the target repair pipeline.

The failure feedback information refers to feedback information related to gas equipments during use by gas users. For example, the failure feedback information may include feedback information such as whether the gas equipment fails, and whether the gas pipeline is damaged, etc.

The repair feedback information refers to feedback information of a repair effect after repairing the gas equipment or the gas pipeline that needs to be repaired. For example, the repair feedback information may include feedback information that, after repairing the gas equipment or the gas pipeline that needs to be repaired, the gas output is still small.

The gas usage feedback information refers to feedback information of the gas user in response to a gas usage. For example, the gas usage feedback information may include feedback information in which the gas user uses gas in the same way at the same time period of each day, but a current gas usage is larger than a previous gas usage.

In some embodiments, the government supervision and management platform may receive the feedback information captured by the citizen user platform through the government supervision service platform.

Step 232, determining an updated collection frequency for a pressure regulating equipment and a gas metering device deployed on a target gas pipeline based on the feedback information, and sending the updated collection frequency to the pressure regulating equipment and the gas metering device for performed.

The target gas pipeline is a branch of the gas pipeline where the target repair pipeline is located.

The pressure regulating equipment refers to an equipment used to control a pressure in a gas pipeline and maintain the pressure within a preset range, for example, a gas pressure differential meter, etc. The preset range may be preset for a person skilled in the art based on experience.

A gas metering device is a device that is used to measure a gas flow of the gas pipeline, for example, a differential pressure flow meter, etc.

A collection frequency refers to a frequency of equipment adjusting a pressure in the gas pipeline by the pressure regulating or a frequency of measuring the gas flow in the gas pipeline by the gas metering device.

The updated collection frequency is the collection frequency after update.

In some embodiments, the government supervision and management platform may determine a number of negative feedback received during the repair of the target repair pipeline based on the feedback information; determine an adjustment amount of the collection frequency based on the number of negative feedback; and determine the updated collection frequency based on the adjustment amount of the collection frequency and an initial collection frequency.

The negative feedback may include negative fault feedback information, negative repair feedback information, negative gas usage feedback information, and so on. The negative fault feedback information may include gas equipment failure, etc. The negative repair feedback information may include that for the gas equipment or the gas pipeline that needs to be repaired, after the repair, a gas outflow is still low. The negative gas usage feedback information may include that the gas user uses gas in the same way at the same time period of each day, but a current gas usage is larger than a previous gas usage.

In some embodiments, the government supervision and management platform may count a number of negative feedback information received as the number of negative feedbacks during the repair of the target repair pipeline.

In some embodiments, the government supervision and management platform may determine the adjustment amount of the collection frequency based on the number of negative feedbacks by means of a third preset comparison table.

The third preset comparison table includes the corresponding relationship between a number of reference negative feedbacks and a reference adjustment amount of the collection frequency. The third preset comparison table may be constructed based on the priori knowledge or the historical data.

The initial collection frequency may be preset for a person skilled in the art based on experience.

For illustrative purposes only, the government supervision and management platform may use the following first formula to determine the updated collection frequency:

$$K1 = a1 + b1;$$

where K1 denotes the updated collection frequency, a1 denotes the initial collection frequency, and b1 denotes the adjustment amount of the collection frequency.

Step 233, obtaining a pressure regulating parameter during a repair process captured by the pressure regulating equipment and a gas supply parameter during the repair process captured by the gas metering device.

The pressure regulating parameter is parameter of the pressure regulating equipment. For example, the pressure regulating parameter may include a target pressure, a regulating speed of the pressure regulating equipment, or the like.

The gas supply parameter is a parameter related to a gas supply of the target gas pipeline, for example, an amount of the gas supply of the target gas pipeline, etc.

In some embodiments, the gas company management platform may obtain the pressure regulating parameter in the repair process collected by the pressure regulating equipment and the gas supply parameter in the repair process collected by the gas metering device from the gas equipment object platform through the gas company sensor network platform. Then the government supervision and management platform may obtain, through the government supervision sensor network platform, the pressure regulating parameter during the repair process and the gas supply parameter during the repair process from the gas company management platform.

Step 234, obtaining monitoring data captured by monitoring components deployed on remaining target repair pipelines through the gas company management platform.

The remaining target repair pipeline refers to a target repair pipeline that has not executed the repair command.

The monitoring components are components that monitor the pipeline operation parameter. The monitoring components may include pressure sensors, temperature sensors, flow rate sensors, etc.

The monitoring data is data acquired by the monitoring components.

In some embodiments, the monitoring data may include the pipeline operation parameter.

In some embodiments, the gas company management platform may obtain the monitoring data from the gas equipment object platform by the gas company sensor network platform.

Step 235, generating a repair update command based on the pipeline data to be repaired, the pressure regulating parameter, the gas supply parameter, and the monitoring data.

The repair update command refers to a command used to update the repair command in the pipeline repair sequence. The repair update command may be used to control the updating of the pipeline repair sequence.

In some embodiments, updating the pipeline repair sequence may represent the order in which a plurality of target repair pipelines of the same fault type are to be repaired.

In some embodiments, the government supervision and management platform may determine the repair urgency of a plurality of target repair pipelines of a same fault type based on the pipeline data to be repaired, the pressure regulating parameter, the gas supply parameter, and the monitoring data; sort the repair urgency of the plurality of target repair pipelines of the same fault type from high to low to obtain the sorting result of the repair urgency; and re-determine the repair order of the target repair pipelines based on the sorting result of the repair urgency.

In some embodiments, the government supervision and management platform may determine the repair urgency of the target repair pipeline based on the pipeline data to be repaired, the pressure regulating parameters, the gas supply parameters, and the monitoring data by means of a fourth preset comparison table.

The fourth preset comparison table includes a correspondence between reference repair pipeline data, reference pressure regulating parameter, reference gas supply parameter, and reference monitoring data and the repair urgency of the reference target repair pipeline. The fourth preset comparison table may be constructed based on the priori knowledge or the historical data.

In some embodiments, the government supervision and management platform may use the ranking result of the target repair pipeline corresponding to the ranking result of the repair urgency as a repair order of a re-determined target repair pipeline.

In some embodiments, the government supervision and management platform may also generate a repair update command using a method shown in FIG. 4, see the described in FIG. 4.

In some embodiments, the smart gas-based pipeline repair method may further include steps 240-step 260 as follows.

Step 240, for the repair command in progress, in response to the presence of a pipeline repair equipment that satisfies a predetermined condition, estimating a total repair time of each of the repair commands in progress.

The predetermined condition may include the pipeline repair equipment is a new assignable pipeline repair equipment. The new assignable pipeline repair equipment may include one of an idle pipeline repair equipment, a newly acquired pipeline repair equipment, and a repaired pipeline repair equipment. The idle pipeline repair equipment refers to a pipeline repair equipment that has been occupied before, used to repair the target repair pipeline, and is currently out of use. The repaired pipeline repair equipment is a pipeline repair equipment that was previously underperforming, but is now ready to be put back into service after overhaul.

The total repair time is a total time spent completing a repair of the target repair pipeline.

In some embodiments, the government supervision and management platform may determine a first target feature vector based on the target repair pipeline data and repair parameter corresponding to the target repair pipeline data; determine a plurality of first correlation feature vectors based on the first target feature vector through a first vector database; determine the total repair time of the target repair pipeline corresponding to the repair command by summing a total repair time of the reference repair corresponding to the multiple first associated feature vectors. The weights may be predetermined empirically for a person skilled in the art.

The first vector database includes a plurality of first reference feature vectors, wherein there exists a reference total repair time corresponding to each of the first reference feature vectors. The first reference feature vectors are feature vectors constructed based on historical repair pipeline data and repair parameters corresponding to the historical repair pipeline data.

In some embodiments, the weight corresponding to each of the first associated feature vectors may be determined by the government supervision and management platform based on a historical total repair time corresponding to the first associated feature vector.

The historical total repair time refers to a total time spent of completing a historical target repair pipeline repaired.

In some embodiments, the government supervision and management platform may take the historical total repair time corresponding to the first correlation feature vector, and determine a weight corresponding to the first correlation feature vector via a fifth preset comparison table.

The fifth preset comparison table includes a correspondence between a historical total repair time corresponding to the reference first correlation feature vector and a weight corresponding to the reference first correlation feature vector. The fifth preset comparison table may be constructed based on a priori knowledge or the historical data.

In some embodiments, the accuracy of the determined weights can be improved by determining the weights corresponding to the target reference vectors based on the total historical total repair time corresponding to the target reference vectors.

In some embodiments, the government supervision and management platform may, determine a first reference feature vector that meets a predetermined condition in the first vector database based on the first target feature vector, and determine a plurality of the first reference feature vectors that meet the predetermined condition as the associated feature vectors. In some embodiments, the predetermined condition may include a vector distance from the first target feature vector satisfying the predetermined condition, or the like. The predetermined condition may be predetermined for a person skilled in the art based on experience. For example, the vector distance is less than a distance threshold.

Step 250, determining at least one of the target repair commands based on the total repair time.

In some embodiments, the target repair command may include a repair command with a total repair time greater than a repair threshold.

The repair threshold is a critical value for the total repair time. The repair threshold may be predetermined empirically for those skilled in the art.

In some embodiments, the government supervision and management platform may determine the repair threshold based on the repair urgency of the target repair pipeline. For example, a higher a repair urgency of the target repair pipeline, a lower the repair threshold may be predetermined.

In some embodiments, the repair threshold is determined based on the repair urgency of the target repair pipeline; when the repair urgency of the target repair pipeline is higher, which represents a higher risk of a gas accident, the repair threshold can be appropriately lowered in order to shorten the total repair time and reduce the risk.

In some embodiments, the government supervision and management platform may identify a repair command whose total repair time is greater than the repair threshold as the target repair command.

Step 260, updating the repair parameters of the target repair commands.

In some embodiments, in response to existence of a plurality of pipeline repair equipment satisfying a predetermined condition and existence of a plurality of target repair commands, the government supervision and management platform may sort the repair urgencies of the target repair pipelines corresponding to the target repair commands in a high to low in order to redetermine the repair order of each of the target repair pipelines and/or the type of the target pipeline repair equipment used to repair the target repair pipeline, realizing the updating of the repair parameter of each of the target repair commands.

In some embodiments, the pipeline repair sequence is determined based on the pipeline repair equipment information and the pipeline data to be repaired; and in the process of executing the repair commands of the pipeline repair sequence, obtaining the feedback information of the citizen users, the regulating parameters, the gas supply parameters, and the monitoring data, generating the repair update commands, and timely controlling and updating the repair commands that have not yet been executed in the pipeline repair sequence, in order to determine a reasonable pipeline repair sequence as a means of repairing the gas pipeline, repairing the malfunctioning gas pipeline, and ensuring the gas supply demand of the citizen users.

Additionally, for the ongoing repair commands, if there exists a new pipeline repair equipment that can be assigned, the total repair time of the ongoing multiple repair commands is estimated, and then priority is given to the target repair commands with a total repair time that is greater than the repair threshold, and the repair parameters are adjusted to ensure that urgent target repair pipelines are prioritized for repair to further ensure the gas supply needs of the gas users.

FIG. 3 is an exemplary flowchart of determining a pipeline repair sequence according to some embodiments of the present disclosure. In some embodiments, the process 300 may be performed by the government supervision and management platform of the IoT system 100 for pipeline repair based on smart gas. As shown in FIG. 3, the process 300 includes step 310-step 350 as described below.

Step 310, determining performance level of pipeline repair equipments based on pipeline repair equipment information.

For a description of the pipeline repair equipment information, see the related instructions in step 210 of FIG. 2.

The performance level can reflect how effective the performance of the pipeline repair equipment is. For example, the better the performance of the pipeline repair equipment, the higher the performance level.

In some embodiments, the performance level may be expressed as a numerical value, with higher values resulting in the better performance level.

In some embodiments, the government supervision and management platform may determine a second target feature vector based on the pipeline repair equipment information; determine a plurality of second correlation feature vectors based on the second target feature vector through a second vector database; and take a mean value of a fault degree in the reference performance situation corresponding to the plurality of second correlation feature vectors as the performance level of the pipeline repair equipment.

The second vector database includes a plurality of second reference feature vectors, wherein each of the plurality of second reference feature vectors has a corresponding reference performance situation. The reference feature vectors are feature vectors constructed based on historical pipeline repair equipment information.

The reference performance situation can reflect whether the pipeline repair equipment fails and the fault degree during the historical actual repair process.

The fault degree refers to a degree of failure of the pipeline repair equipment during the historical actual repair process. The fault degree may be in the form of a score, which may be determined by a person skilled in the art based on experience.

In some embodiments, the government supervision and management platform may construct a reference performance situation based on whether the pipeline repair equipment fails and the fault degree during the historical actual repair process.

In some embodiments, the government supervision and management platform may determine a second reference feature vector in the second vector database that meets a predetermined condition based on the second target feature vector; and determine a plurality of the second reference feature vectors that meet the predetermined condition as second correlation feature vectors. In some embodiments, the predetermined condition may include that a vector distance between the second reference feature vector and the second target feature vector satisfies a predetermined condition, etc. The predetermined condition may be preset for those skilled in the art based on experience. For example, the vector distance is less than a distance threshold.

Step 320, identifying the target pipeline repair equipment based on the performance level.

In some embodiments, the target pipeline repair equipment may include a pipeline repair equipment that is in an idle state and has a performance level that is above a performance threshold. For more description of the target pipeline repair equipment, see the description in step 220 of FIG. 2. The performance threshold is a critical value of the performance level.

The performance threshold may be preset for those skilled in the art based on experience.

In some embodiments, the government supervision and management platform may determine performance thresholds for different types of pipeline repair equipment based on a use degree of the corresponding pipeline repair equipment during the repair process. For example, the higher use degree of the pipeline repair equipment in the repair process, the higher the value of the performance threshold may be preset.

In some embodiments, the government supervision and management platform may determine the use degree of any pipeline repair equipment during the repair process by using steps 321-step 322 as follows:

Step 321, obtaining a plurality of predetermined groups (e.g., a predetermined m groups, where m is a positive integer greater than or equal to 1) of historical usage data for a certain type (e.g., type A) of the pipeline repair equipments that have been used.

Each group of historical usage data may include a total use time of different types of pipeline repair equipment and a historical total repair time in the process of repairing a historical target repair pipeline, and each group of historical usage data uses a certain type (e.g., Type A) of pipeline repair equipment.

The total use time refers to a time length that a particular type of pipeline repair equipment is used to repair the pipeline during a completion of a historical target repair pipeline.

For a description of the historical total repair time, see the description in step 240 of FIG. 2.

In some embodiments, the government supervision and management platform may obtain the total use time and the historical total repair time through a monitoring equipment (e.g., a time sensor) set on the pipeline repair equipment.

Step 322, determining the use degree of the corresponding type (e.g., type A) pipeline repair equipment based on the sum of the total use time of the pipeline repair equipment of a particular type (e.g., type A) corresponding to a plurality of predetermined groups (e.g., a predetermined m groups) of historical usage data and the sum of the historical total repair time corresponding to the plurality of groups of historical usage data.

Only by way of example, the government supervision and management platform may determine the use degree of a type A of the pipeline repair equipment, wherein the type A may be any type, by using a following second formula:

$K2 = a2 + b2 \times 100\%$, wherein K2 denotes the use degree of the type A of the pipeline repair equipment, a2 denotes the sum of the total use time of the type A of the pipeline repair equipment corresponding to the predetermined m groups of historical usage data, and b2 denotes the sum of the historical total repair time corresponding to the m groups of historical usage data.

In some embodiments, the performance thresholds for different types of the pipeline repair equipment are determined based on the use degree of the corresponding pipeline repair equipment during the repair process. When the use degree of the pipeline repair equipment in the repair process is higher, it represents that the pipeline repair equipment has a greater impact on the repair results during the repair process of the target repair pipeline. At this time, a higher the performance threshold of the pipeline repair equipment with a high use degree can be set, so that the selected pipeline repair equipment is more reliable, thus ensuring the repair effect of the target repair pipeline as well as avoiding damage to the pipeline repair equipment during the repair process.

In some embodiments, the government supervision and management platform may identify the pipeline repair equipment that is in an idle state and has a performance level above the performance threshold, as the target pipeline repair equipment based on the performance level of the pipeline repair equipment.

Step 330, determining a repair urgency for each pipeline to be repaired based on the pipeline data to be repaired.

For a description of the pipeline data to be repaired and the repair urgency see the description in step 210 of FIG. 2.

In some embodiments, the government supervision and management platform may determine the repair urgency for each pipeline to be repaired based on the pipeline data to be repaired by means of a sixth preset comparison table.

The sixth preset comparison table includes a correspondence between a reference repair pipeline data and a repair urgency of the reference repair pipeline. The sixth preset comparison table can be constructed from a priori knowledge or the historical data.

In some embodiments, the government supervision and management platform may also construct a pipeline map to be repaired based on the pipeline data to be repaired; and determine the repair urgency for each pipeline to be repaired by a repair prediction model based on the pipeline map to be repaired.

The pipeline map to be repaired is a connection map between individual pipelines to be repaired.

In some embodiments, the pipeline map to be repaired may include nodes and edges, the edges connecting the nodes, and the nodes and the edges may have attributes.

In some embodiments, the nodes of the pipeline map to be repaired may correspond to the pipelines to be repaired. Node attributes may reflect relevant characteristics of the pipeline to be repaired to which the nodes correspond. For example, a node attribute may include: a fault type, a location, and a length of the pipeline to be repaired, and a pipeline operation parameter captured at a preset time period. For a description of the fault type, the preset time period, and the pipeline operation parameters, see the description in step 210 of FIG. 2.

In some embodiments, the node attribute of the pipeline map to be repaired may also include: a total number of gas residents in a surrounding area and downstream of the pipeline to be repaired and a historical gas usage of the downstream gas residents.

The surrounding area refers to an area within a preset radius centered on the pipeline to be repaired. The preset radius may be preset according to the experience of technicians in this field.

The historical gas usage is a total amount of gas used by all gas residents located downstream of the pipeline to be repaired during the preset time period. The preset time period may be preset for a person skilled in the art based on experience.

In some embodiments, since the node attributes of the pipeline map to be repaired may also include the total number of gas residents in a surrounding area and downstream of the pipeline to be repaired and the historical gas usage of the downstream gas residents, this can further enhance an accuracy of the finalized repair urgency of each of the pipelines to be repaired.

In some embodiments, an edge of a pipeline map to be repaired represents a connection between two pipelines to be repaired. Edge attributes may reflect relevant characteristics of a connectivity pathway between the two pipelines to be repaired. For example, the edge attribute may include: a connected area of the two connected pipelines to be repaired corresponding to the edge.

In some embodiments, the repair prediction model may be a machine learning model. In some embodiments, a type of the repair prediction model may include a Graph Neural Networks (GNN) model. The output of the repair prediction model may be a repair urgency corresponding to each node.

In some embodiments, the repair prediction model may be trained based on a plurality of first training samples with first training labels.

In some embodiments, each group of the first training samples of the first training samples may include a historical sample pipeline map to be repaired. The historical sample pipeline map to be repaired refers to a pipeline map to be repaired constructed based on the historical sample pipelines to be repaired. In some embodiments, since a plurality of historical sample pipelines to be repaired may exist on the historical sample pipeline map to be repaired, the first training label may include a plurality of first sub-training labels, each of the plurality of first sub-training labels corresponding to a historical sample pipeline to be repaired.

In some embodiments, the government supervision and management platform may construct the historical sample pipeline map to be repaired by the historical sample pipelines to be repaired, wherein the node attribute and the edge attribute of the historical sample pipeline map to be repaired may be determined based on the historical data.

In some embodiments, the first training label may be a repair urgency corresponding to a pipeline to be repaired for each node of the historical sample pipeline map to be repaired.

The first training label can be determined by manual annotation.

In some embodiments, the government supervision and management platform may construct a first training label based on a first gas safety situation and a first user feedback of a first historical preset period corresponding to the first training sample.

In some embodiments, the first gas safety situation may include a plurality of first sub-gas safety situations, each of the plurality of first sub-gas safety situation corresponding to a first sub-training label.

The first sub-gas safety situation refers to whether an accident such as explosion occurs in a pipeline to be repaired and its corresponding first sub-risk score from a historical moment t1 corresponding to the first training sample to the beginning of repair. The first sub-risk score may be a score in the interval 0 to a, wherein a is any number greater than 0. The first historical preset time period can be a time period from the historical moment t1 to the time period where a restoration was located before a restoration started.

The historical moment t1 can be determined empirically for those skilled in the art.

In some embodiments, the government supervision and management platform may determine the first sub-risk score corresponding to a particular pipeline to be repaired based on human casualties, property damage, or the like of the accidents associated with the particular pipeline to be repaired during the first historical preset time period. For example, a greater the human casualties and a more severe the property damage of the accident related to a particular pipeline to be repaired, a higher the first sub-risk score corresponding to that pipeline to be repaired.

In some embodiments, the first user feedback may comprise a plurality of first sub-user feedbacks, each of which corresponds to a first sub-training label.

The first sub-user feedback refers to a number of negative feedbacks from the surrounding area and downstream gas residents of a pipeline to be repaired during the first historical preset period. For the method of determining the number of negative feedbacks, see the preceding description.

For illustrative purposes only, the government supervision and management platform may determine each first sub-training label of the first training label by using a following third formula:

$K3=a3+b3$; wherein K3 denotes the first sub-training label, a3 denotes the first sub-risk score, and b3 denotes the first sub-user feedback.

In some embodiments, the government supervision and management platform may input the historical sample pipeline map to be repaired of the first training sample with the first training label into an initial repair prediction model; then through the first training label and a prediction result of the initial repair prediction model, the loss function is then constructed; and parameters of the initial repair prediction model are iteratively updated based on the loss function until the loss function converges, a number of iterations reaches a threshold, and so on, and the training is completed, and a trained repair prediction model is obtained.

In some embodiments, the government supervision and management platform may input a pipeline map to be repaired into the repair prediction model, and the repair prediction model outputs a repair urgency for each pipeline to be repaired.

In some embodiments, by inputting the constructed pipeline map to be repaired into the repair prediction model to determine the repair urgency of each pipeline to be repaired, the repair urgency of each pipeline to be repaired can be predicted quickly and accurately.

Step 340, determining at least one target repair pipeline based on the repair urgency.

In some embodiments, the target repair pipeline may include a pipeline to be repaired that is in an idle state and the repair urgency is higher than an urgency threshold. For a more detailed description of the target repair pipeline, see the related description in FIG. 2, step 220.

The urgency threshold is a critical value for the repair urgency. The urgency threshold may be predetermined for a person skilled in the art based on experience.

In some embodiments, the government supervision and management platform may determine the urgency threshold based on a difference between the ambient temperature and a predetermined temperature range. For example, a greater the difference, a lower the urgency threshold may be preset.

The ambient temperature refers to a temperature of an environment in which the target repair pipeline is located. The government supervision and management platform can obtain the ambient temperature through monitoring devices (e.g., temperature sensors, etc.) installed on the target repair pipeline.

The predetermined temperature range is a preset ambient temperature range for normal conditions. The predetermined temperature range may be preset empirically for those skilled in the art.

In some embodiments, since the urgency threshold is set to be determined based on the difference between the ambient temperature and the predetermined temperature range, when the ambient temperature of the environment in which the target repair pipeline is located is either higher or lower than the predetermined temperature range, the risk of a gas accident directly or indirectly caused by the failed target repair pipeline will be higher than when it is located in the predetermined temperature range, at which time the urgency threshold can be reduced to enable more pipelines to be repaired to enter into supervision and reduce the risk of a gas accident.

In some embodiments, the government supervision and management platform may identify a pipeline to be repaired that is in an idle state and a repair urgency is higher than an urgency threshold, as the target repair pipeline based on the repair urgency of each pipeline to be repaired.

Step 350, determining the pipeline repair sequence based on the target pipeline repair equipment and the repair urgency of the target repair pipeline.

For a description of the pipeline repair sequence, see the instructions in FIG. 2, step 220.

In some embodiments, the government supervision and management platform may determine, based on the fault type of the target repair pipeline, the target pipeline repair equipment corresponding to the target repair pipeline; sort the repair urgency of the target repair pipeline from high to low, and determine the sorting result of the repair urgency; and take the ranking result of the target repair pipeline corresponding to the ranking result of the repair urgency as the repair order of the target repair pipeline, so as to determine the pipeline repair sequence.

For instructions on how to determine the target pipeline repair equipment corresponding to the target repair pipeline based on the fault type of the target repair pipeline, see the instructions in FIG. 2, step 210.

In some embodiments, the pipeline repair sequence is determined by the target pipeline repair equipment based on the performance level of the pipeline repair equipment and the repair urgency of the target repair pipeline, and so as to ensure that the pipeline repair equipment in idle state and the high performance level is given priority to the target repair pipeline with high repair urgency, which can further improve a rationality of the determined pipeline repair sequence, so as to better meet the gas supply demand of the citizen users.

FIG. 4 is an exemplary flowchart of a generating a repair update command according to some embodiments of the present disclosure. In some embodiments, the process 400 may be performed by the government supervision and management platform of the IoT system 100 for pipeline repair based on smart gas. As shown in FIG. 4, the process 400 includes step 410-step 420 as described below.

Step 410, determining a pipeline map to be repaired based on pipeline data to be repaired.

For a description of the pipeline data to be repaired, see the related instructions in FIG. 2, step 210.

For the definition of the pipeline map to be repaired and instructions on how to construct the pipeline map to be repaired, please refer to the relevant instructions in FIG. 3, Step 330.

Step 420, determining an updated repair urgency of the remaining target repair pipelines based on the pipeline map to be repaired, the pressure regulating parameter, the gas supply parameter, and the monitoring data by a repair update model.

For a description of the pressure regulating parameter, the gas supply parameter, the remaining target repair pipeline, and the repair urgency, please refer to the relevant instructions in FIG. 2.

In some embodiments, the monitoring data may further include at least one of audio data, traffic information and people flow information around the target repair pipeline. For a more detailed description of the monitoring data, see the description in step 234 of FIG. 2.

The audio data refers to sound data related to an operation of the target repair pipeline. The audio data can reflect whether a sound of pipeline operation is normal.

In some embodiments, the gas company management platform may obtain the audio data from a sound sensor installed on the target repair pipeline, from the gas equipment object platform, by the gas company sensor network platform. The government supervision and management platform may obtain the audio data collected by the sound sensor installed on the target repair pipeline from the gas company management platform by the government supervision sensor network platform.

The traffic information is information related to traffic around the target repair pipeline. For example, a traffic flow around the target repair pipeline, a vehicle speed, and so on.

The people flow information is information related to a people flow around the target repair pipeline. For example, people flow around the target repair pipeline.

The traffic information and people flow information around the target repair pipeline are potential hidden dangers, which can affect a degree of harm caused by a gas accident caused by the target repair pipeline. For example, a gas accident caused by the same target repair pipeline results in a greater number of injuries and deaths when more people are around the target repair pipeline.

In some embodiments, the government supervision and management platform may obtain the traffic information and the people flow information through a camera device (e.g., a video camera).

In some embodiments, in the process of determining the updated repair urgency of the remaining target repair pipeline, the monitoring data used not only considers the pipeline operation parameter, but also considers the audio data, the traffic information and the people flow information around the target repair pipeline, which further improves an accuracy of the updated repair urgency of the final remaining target repair pipeline.

In some embodiments, the repair update model 413 may be a machine learning model. In some embodiments, a type of the repair update model 413 may include a Graph Neural Networks (GNN) model. The output of the repair update model 413 may be the updated repair urgency corresponding to a specific node, and the specific node may correspond to the remaining target repair pipeline.

In some embodiments, the input of the repair update model 413 may include the pipeline map to be repaired 411-1, the pressure regulating parameter 411-2, the gas supply parameter 411-3, and the monitoring data 411-4, and the output may include the updated repair urgency 414 for the remaining target repair pipeline.

In some embodiments, the inputs to the repair update model may also include a repair urgency 412 for each pipeline to be repaired as output by the repair prediction model.

For a description of the repair urgency of each pipeline to be repaired, see the instructions in step 330 of FIG. 3.

In some embodiments, the input of the repair update model also considers the repair urgency of each pipeline to be repaired, which can further improve the accuracy of the updated repair urgency of the remaining target repair pipeline.

In some embodiments, the repair update model may be trained based on a plurality of second training samples with second training labels.

In some embodiments, each set of second training samples may include a historical sample pipeline map to be repaired, a historical sample pressure regulating parameter, a historical sample gas supply parameter, and historical sample monitoring data, and the second training labels may be the remaining updated actual repair urgency of the historical sample repair pipeline. In some embodiments, there may be a plurality of remaining historical sample target repair pipelines on the historical sample pipeline map to be repaired, and the second training label may comprise a plurality of second sub-training labels, each of the plurality of second sub-training label corresponding to a remaining historical sample target repair pipeline.

In some embodiments, the second training samples may be obtained based on historical data, and the second training labels may be obtained based on manual labeling.

In some embodiments, the government supervision and management platform may construct a second training label based on a second gas safety situation and a second user feedback of a second historical preset period corresponding to the second training sample.

In some embodiments, the second gas safety situation may include a plurality of second sub-gas safety situations, each second sub-safety gas situation corresponding to a second sub-training label.

The second sub-gas safety situation refers to whether an accident such as explosion occurs in the repaired pipeline of a remaining historical sample target repair pipeline and its corresponding second sub-risk score from a historical moment t2 corresponding to the second training sample to the beginning of repair. The second sub-risk score may be a score in the range of 0 to a, wherein a is any number greater than 0. The historical moment t1 may be earlier than the historical moment t2. The second historical preset time period may be a time period between the historical moment t2 and the start of the repair.

The historical moment t2 may be determined based on the experience of skilled individuals in the field.

In some embodiments, the government supervision and management platform may determine the second sub-risk score corresponding to the remaining historical sample target repair pipeline based on human casualties, property damage, or the like of accidents related to a particular remaining historical sample target repair pipeline during the second historical preset time period. For example, a greater the human casualties of an accident related to the remaining historical sample target repair pipeline, a more severe the property damage of the accident, and a higher the second sub-risk score corresponding to the remaining historical sample target repair pipeline.

In some embodiments, the second user feedback may include a plurality of second sub-user feedbacks, each of which corresponds to a second sub-training label.

The second sub-user feedback refers to a number of negative feedbacks of gas residents for a remaining historical sample target repair pipeline, which are in a surrounding area and a downstream of the remaining historical sample target repair pipeline, during the second historical preset time period. For the method for determining the number of negative feedbacks, see the related description in FIG. 3.

Only by way of example, the government supervision and management platform may determine each of the plurality of second sub-training labels in the second training label by using a following fourth formula:

K4=a4+b4. wherein K4 denotes the second sub-training label, a4 denotes the second sub-risk score, and b4 denotes the second sub user feedback.

In some embodiments, the government supervision and management platform may obtain the plurality of sets of second training samples with the second training labels; input the plurality of sets of second training samples with the second training labels into an initial repair update model to perform a plurality of rounds of iteration; and when an end condition of iteration is satisfied, end the iteration to obtain a trained repair update model. The end condition can be that the loss function converges, a number of iterations reaches a threshold, etc.

In some embodiments, for each round of iteration, the government supervision and management platform may perform by using steps 421-steps 423 as follows:

Step 421, obtaining an output of the initial repair update model corresponding to one or more second training samples, by inputting the historical sample pipeline map to be repaired, the historical sample pressure regulating parameter during a repair process, the historical sample gas supply parameters during the repair process, and the historical sample monitoring data from the plurality of second training samples with the second training labels into the initial repair update model.

Step 422, calculating a value of the loss function based on the output of the initial repair update model corresponding to the one or more second training samples, and the second training labels of the one or more second training samples, by substituting them into the formula of the predefined loss function.

Step 423, inversely updating the model parameters in the initial repair update model based on the value of the loss function.

The government supervision and management platforms can use various methods to perform reverse updates. For example, the government supervision and management platform may perform a reverse update based on a gradient descent method. In some embodiments, the second training sample may also include a repair urgency of each historical sample repair pipeline of the repair prediction model output.

In some embodiments, the repair prediction model and the repair update model may be obtained by joint training. Parameters of the repair prediction model and the repair update model need to be updated simultaneously at each iteration. The training sample corresponding to the repair prediction model is noted as a first training sample, and the corresponding training label is noted as a first training label. The first training sample includes a historical sample pipeline map to be repaired, there exists a plurality of historical sample pipelines to be repaired on the historical sample pipeline map to be repaired, and the first training label may include a plurality of first sub-training labels, each of the first sub-training labels corresponding to a historical sample pipeline to be repaired. The training sample corresponding to the repair update model is noted as a second training sample, and the corresponding training label is noted as a second training label. The second training sample includes the historical sample pipeline map to be repaired, and a plurality of remaining historical sample target repair pipelines exist on the historical sample pipeline map to be repaired. The second training label may include a plurality of second sub-training labels, each second sub-training label corresponding to a remaining historical sample target repair pipeline.

For a description of the first training sample and the first training label, see the description in step 330 of FIG. 3.

A difference between a result obtained by a prediction of the repair prediction model and the first training label is noted as a first loss term, the first loss term includes a plurality of first sub-loss terms, and each of which corresponds to a difference between a predicted value of the repair urgency of a pipeline to be repaired and a corresponding first sub-training label.

A difference between a result obtained by a prediction of the repair update model and the second training label is noted as a second loss term, the second loss term includes a plurality of second sub-loss terms, and each of which corresponds to a difference between a predicted value of the updated repair urgency and a corresponding second sub-training label, the predicted value of the updated repair urgency corresponding to the remaining target repair pipeline.

The loss function value for the joint training is obtained based on a weighted sum of the first loss term and the second loss term. The first loss term corresponds to a first weight, and the first weight includes a plurality of first sub-weights, and each of which corresponds to a first sub-loss term. The second loss term corresponds to a second weight, the second weight includes a plurality of second sub-weights, and each second sub-weight corresponding to a second sub-loss term.

In some embodiments, the government supervision and management platform may determine the first sub-weight based on a fault type corresponding to the historical sample pipeline to be repaired and a second sub-weight based on a fault type of the remaining historical sample target repair pipeline.

In some embodiments, a more serious the fault type corresponding to the historical sample pipeline to be repaired, the government supervision and management platform may preset a larger value of the first sub-weight corresponding to the historical sample pipeline to be repaired. A severity of the pipeline to be repaired corresponding to different fault types may be different.

The person skilled in the art can empirically predetermine the severity of the pipeline to be repaired corresponding to different fault types. For example, if the fault type of the pipeline to be repaired belongs to a loophole failure or a crack failure of gas leakage, the severity of the pipeline to be repaired corresponding to this fault type may be preset to very severe since this fault type can easily cause an explosion. For example, if the fault type of the pipeline to be repaired belongs to a clogging fault, and since the fault type will at most cause inconvenience to the gas user but will not cause a safety hazard for a while, the severity of the pipeline to be repaired corresponding to the fault type may be preset to slight.

In some embodiments, the fault type corresponding to the remaining historical sample target repair pipeline is more severe, the government supervision and management platform may preset a larger value of the second sub-weight corresponding to the remaining historical sample target repair pipeline. A method of determining the severity of the pipeline to be repaired corresponding to the different fault types is similar to the method of determining the severity of the pipeline to be repaired, as described in the preceding description.

During joint training of the repair prediction model and the repair update model, a historical sample pipeline map to be repaired from the first training samples with the first training labels may be input into the initial repair prediction model. Then, the repair urgency corresponding to each historical sample pipeline to be repaired outputted by the initial repair prediction model, as well as the historical sample pipeline map to be repaired, and the historical sample pressure regulating parameter during the repair process, the historical sample gas supply parameter during the repair process, and the historical sample monitoring data of the second training sample, are inputted into the initial repair update model. The value of the loss function is then obtained by weighted summation of the first loss term and the second loss term. Simultaneously, parameters of the initial repair prediction model and the initial repair update model are iteratively updated until a loss function converges, a number of iterations reaches a threshold, etc. and the training is completed to obtain a trained repair prediction model and a trained repair update model. The government supervision and management platform may record a difference between a result predicted by the initial repair prediction model and the first training label as the first loss term, and a difference between a result predicted by the initial repair update model and the second training label as the second loss term.

In some embodiments, the repair prediction model and the repair update model are obtained by joint training, which can improve an efficiency of training. Meanwhile, in the joint training process, the loss function value of the joint training is obtained based on the weighted summation of the first loss term and the second loss term, which may further improve the accuracy of the final prediction result of the repair prediction model and the repair update model obtained by joint training.

Step 430, generating the repair update command of the remaining target repair pipeline based on the updated repair urgency.

In some embodiments, the government supervision and management platform may sort the updated repair urgency from high to low to obtain a sorting result of the repair urgency; and take the ranking result of the remaining target repair pipeline corresponding the ranking result of repair urgency, as a re-determined order of repair of the remaining target repair pipelines, in order to generate the repair update command of the remaining target repair pipelines.

When the target repair pipeline is actually repaired, multiple target repair pipelines will be repaired at the same time. Due to the influence of the pressure regulating parameter, the audio data, the traffic information and the people flow information around the target repair pipeline during repair, the repair will not only affect the operation of the current target repair pipeline, but also affect the remaining target repair pipeline waiting for repair. For example, increase the possibility of a gas accident before the repair of the remaining target repair pipeline waiting to be repaired, and affect the repair urgency of the remaining target repair pipeline waiting to be repaired.

Re-evaluating the repair urgency of the remaining target repair pipeline to be repaired based on the real-time pipeline repair equipment information and the pipeline data to be repaired in the repair process; and re-determining the pipeline repair sequence in the original way based on the re-evaluation of the repair urgency can further improve a rationality of the determined pipeline repair sequence, so as to better meet the gas supply demand of the citizen users.

What is claimed is:

1. A method for pipeline repair based on smart gas, performed by a government supervision and management platform of an Internet of Things (IoT) system for pipeline repair based on smart gas, the IoT system including a citizen user platform, a government supervision service platform, the government supervision and management platform, a gas company management platform and a gas equipment object platform, and the method comprising:

obtaining pipeline repair equipment information and pipeline data to be repaired through the gas company management platform;

determining a pipeline repair sequence based on the pipeline repair equipment information and the pipeline data to be repaired, wherein
the pipeline repair sequence includes a plurality of repair commands,
each of the plurality of repair commands is performed by at least one target pipeline repair equipment,
the target pipeline repair equipment is a pipeline repair equipment that performs repair for at least one target repair pipeline,
the pipeline repair equipment includes a pipeline filling machine, a pipeline internal coating equipment, a trenchless pipeline repair equipment, a pipeline rapid repair kit, and an endoscopic inspection equipment, and
each of the plurality of repair commands includes the at least one target repair pipeline and repair parameters corresponding to the at least one target repair pipeline;

based on the repair commands, performing at least one of the following operations:
receiving feedback information captured by the citizen user platform through the government supervision service platform;
determining an updated collection frequency for a pressure regulating equipment and a gas metering device deployed on a target gas pipeline based on the feedback information, and sending the updated collection frequency to the pressure regulating equipment and the gas metering device to control the pressure regulating equipment and the gas metering device to perform collection;
obtaining a pressure regulating parameter during a repair process captured by the pressure regulating equipment and a gas supply parameter during the repair process captured by the gas metering device;
obtaining monitoring data captured by monitoring components deployed on remaining target repair pipelines through the gas company management platform;
determining a pipeline map to be repaired based on the pipeline data to be repaired, wherein
each of nodes of the pipeline map to be repaired correspond to a pipeline to be repaired, and
a node attribute includes a fault type, a location, a length of the pipeline to be repaired, a pipeline operation parameter captured at a preset time period, a total number of gas residents in a surrounding area and downstream of the pipeline to be repaired, and a historical gas usage of downstream gas residents;
determining a repair urgency for each pipeline to be repaired based on the pipeline map to be repaired by a repair prediction model, the repair prediction model being a machine learning model;
determining an updated repair urgency of the remaining target repair pipelines based on the pipeline map to be repaired, the pressure regulating parameter, the gas supply parameter, the monitoring data, and the repair urgency for each pipeline to be repaired by a repair update model, the repair update model being a machine learning model, wherein the repair prediction model and the repair update model is obtained by a joint training process, parameters of the repair prediction model and the repair update model are updated simultaneously at each iteration, wherein the joint training process includes:

noting a training sample corresponding to the repair prediction model as a first training sample, and noting a training label corresponding to the first training sample as a first training label, wherein
the first training sample includes a historical sample pipeline map to be repaired,
there exist a plurality of historical sample pipelines to be repaired on the historical sample pipeline map to be repaired, and
the first training label includes a plurality of first sub-training labels, each of the first sub-training labels corresponding to a historical sample pipeline to be repaired;

noting a training sample corresponding to the repair update model as a second training sample, and noting a training label corresponding to the second training sample as a second training label, wherein
the second training sample includes the historical sample pipeline map to be repaired,
a plurality of remaining historical sample target repair pipelines exist on the historical sample pipeline map to be repaired, and
the second training label includes a plurality of second sub-training labels, each of the second sub-training labels corresponds to one of the plurality of remaining historical sample target repair pipelines;

noting a difference between a result obtained by a prediction of the repair prediction model and the first training label as a first loss term, the first loss term including a plurality of first sub-loss terms, each of the plurality of first sub-loss terms corresponding to a difference between a predicted value of the repair urgency of the pipeline to be repaired and the corresponding first sub-training label;

noting a difference between the result obtained by the prediction of the repair update model and the second training label as a second loss term, the second loss term including a plurality of second sub-loss terms, each of the plurality of second sub-loss terms corresponding to a difference between a predicted value of the updated repair urgency and the corresponding second sub-training label, the predicted value of the updated repair urgency corresponding to the remaining target repair pipeline;

obtaining a loss function value based on a weighted sum of the first loss term and the second loss term, wherein the first loss term corresponds to a first weight, the first weight includes a plurality of first sub-weights, and each of the plurality of first sub-weights corresponds to one of the plurality of first sub-loss terms, the plurality of first sub-weights are determined based on a fault type corresponding to the historical sample pipeline to be repaired, the second loss term corresponds to a second weight, the second weight includes a plurality of second sub-weights, and each of the plurality of second sub-weights corresponds to one of the plurality of second sub-loss terms, and the plurality of second sub-weights are determined based on a fault type of the remaining historical sample target repair pipeline; and generating a repair update command of the remaining target repair pipelines based on the updated repair urgency, wherein the repair update command is used to control and update the repair commands that have not yet been executed in the pipeline repair sequence to determine a reasonable pipeline repair sequence for repairing the gas pipeline, repair a malfunctioning gas pipeline, and ensure a gas supply demand of citizen users.

2. The method of claim 1, wherein the IoT system further includes a government supervision sensor network platform, a government supervision object platform, and a gas company sensor network platform;

the government supervision service platform includes a citizen cloud service sub-platform and a government safety supervision service sub-platform, the government supervision and management platform includes a government gas management sub-platform and a government safety management sub-platform, and the government supervision sensor network platform includes a government gas management sensor network sub-platform and a government safety management sensor network sub-platform, the government supervision object platform including the gas company management platform;

the citizen user platform is configured to interact with data between the citizen cloud service sub-platform and the government safety supervision service sub-platform;

the government gas management sub-platform is configured to interact with data between the citizen cloud service sub-platform and the government gas management sensor network sub-platform;

the government safety management sub-platform is configured to interact with data between the government supervision service platform and the government safety management sensor network sub-platform;

the gas company management platform is configured to interact with data between the government gas management sensor network sub-platform and the government safety management sensor network sub-platform; and the gas company sensor network platform is configured to interact with the gas equipment object platform in data.

3. The method of claim 2, wherein the monitoring data further includes audio data, traffic information, and people flow information around the target repair pipeline, and the method further comprises:

obtaining the audio data collected by a sound sensor installed on the target repair pipeline from the gas company management platform by the government supervision sensor network platform; and obtaining the traffic information and the people flow information through a camera device.

4. The method of claim 1, wherein the determining a pipeline repair sequence based on the pipeline repair equipment information and the pipeline data to be repaired includes:

determining a performance level of pipeline repair equipment based on the pipeline repair equipment information;

identifying the target pipeline repair equipment based on the performance level;

determining the at least one target repair pipeline based on the repair urgency; and determining the pipeline repair sequence based on the target pipeline repair equipment and the repair urgency of the target repair pipeline.

5. The method of claim 4, wherein the target repair pipeline includes a pipeline to be repaired that is in an idle state and has a repair urgency that is higher than an urgency threshold, the urgency threshold is a critical value for the repair urgency, and the method further comprises:

obtaining ambient temperature through monitoring devices installed on the target repair pipeline, the ambient temperature referring to a temperature of an environment in which the target repair pipeline is located; and determining the urgency threshold based on a difference between the ambient temperature and a predetermined temperature range, the predetermined temperature range being a preset ambient temperature range for normal conditions, and the greater the difference, the lower the urgency threshold is preset.

6. The method of claim 4, wherein the target pipeline repair equipment includes a pipeline repair equipment that is in an idle state and has a performance level that is above a performance threshold, the performance threshold being a critical value of the performance level, and the method further comprises:

determining performance thresholds for different types of pipeline repair equipment based on a use degree of the corresponding pipeline repair equipment during the repair process, and the higher use degree, the higher the value of the performance threshold is preset.

7. The method of claim 1, wherein the method further comprises:

for the repair commands in progress, in response to the presence of a pipeline repair equipment that satisfies a predetermined condition, estimating a total repair time of each of the repair commands in progress;

determining at least one target repair command based on the total repair time, the target repair command including a repair command with a total repair time greater than a repair threshold, the repair threshold being a critical value for the total repair time; and updating the repair parameter of the at least one target repair command.

8. The method of claim 7, wherein the repair threshold is determined based on the repair urgency of the target repair pipeline, and the higher the repair urgency of the target repair pipeline, the lower the repair threshold is predetermined.

9. The method of claim 7, wherein the estimating a total repair time of each of the repair commands in progress includes:

determining a target feature vector based on data of the target repair pipeline and the repair parameters corresponding to the data of the target repair pipeline;

determine a plurality of associated feature vectors based on the target feature vector; and determine the total repair time of each of the repair commands by summing a total repair time of the reference repair corresponding to the plurality of associated feature vectors, a weight corresponding to each of the plurality of associated feature vectors being determined based on a historical total repair time corresponding to the associated feature vector.

* * * * *